UNITED STATES PATENT OFFICE.

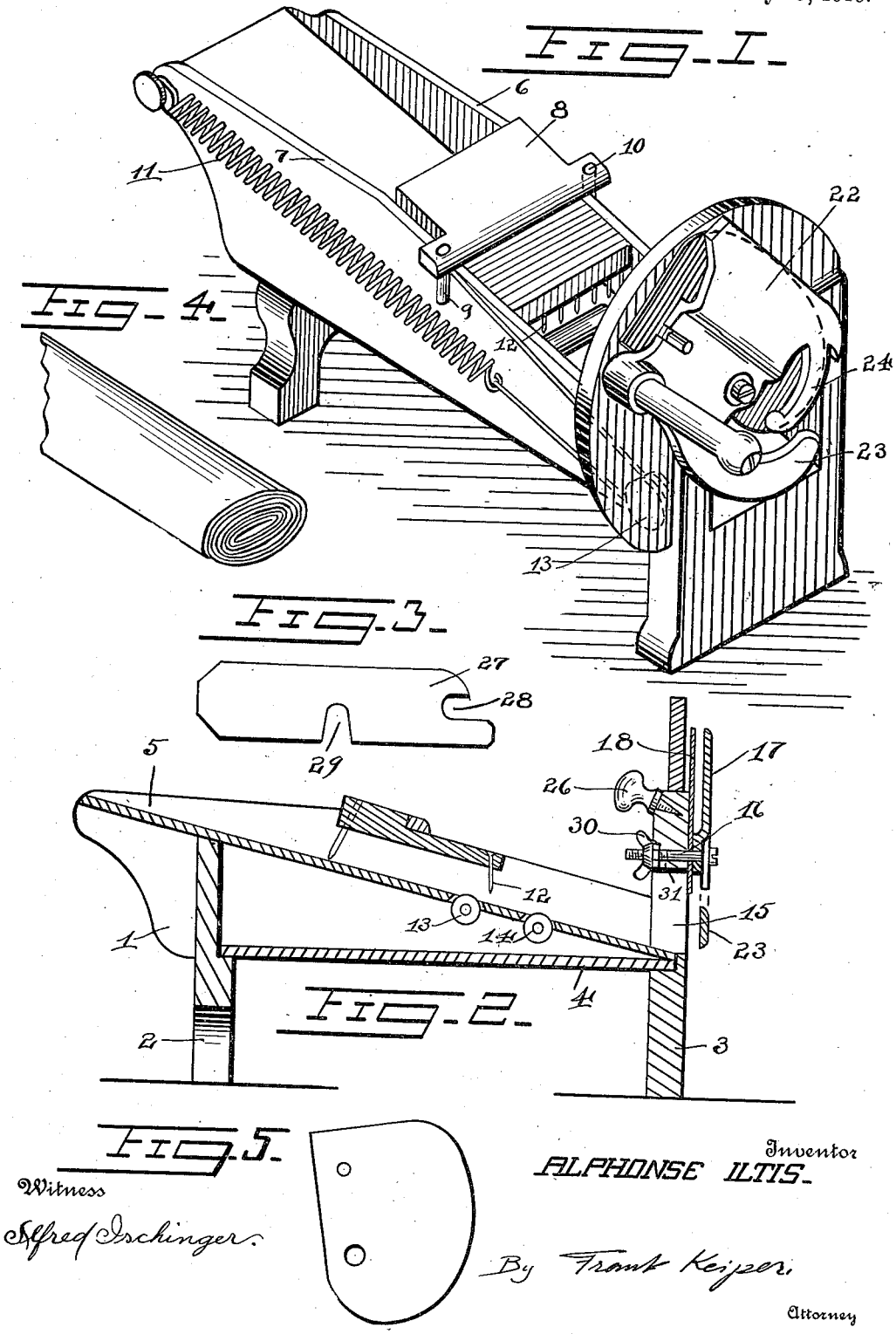

ALPHONSE ILTIS, OF ROCHESTER, NEW YORK.

MACHINE FOR CUTTING NOODLES.

1,310,343.

Specification of Letters Patent.

Patented July 15, 1919.

Application filed May 24, 1919. Serial No. 299,511.

*To all whom it may concern:*

Be it known that I, ALPHONSE ILTIS, a citizen of the United States, residing at Rochester, in the county of Monroe and State of New York, have invented certain new and useful Improvements in Machines for Cutting Noodles, of which the following is a specification.

The object of this invention is to provide a new and improved machine for cutting noodles.

This and other objects of the invention will be fully illustrated in the drawings, described in the specification and pointed out in the claims at the end thereof.

In the drawings,

Figure 1 is a perspective view of the machine.

Fig. 2 is a vertical, longitudinal section through the middle of the machine.

Fig. 3 is a detail view of the spacing washer.

Fig. 4 is a perspective view of the dough flattened out into a thin leaf and formed into a roll preparatory to being cut with the machine.

Fig. 5 is a detail view of the cutting knife.

In the accompanying drawings, like reference numerals indicate like parts.

In the drawings, reference numeral 1 indicates the machine supported on legs 2 and 3 held together by a brace 4. In the machine is supported an inclined base 5, which, with the sides 6 and 7, form a trough on which the noodles are fed to the cutter. Mounted to slide on the sides 6 and 7 is a feed plate 8 which has the pins 9 and 10 thereon which overhang the sides and hold it in place thereon. Fastened on the outside of the machine is a spring 11 having a cable 12 fastened thereto, which cable passes over a pulley 13 and engages with the feed plate 8. The contraction of the spring will pull the feed plate forward.

On the bottom of the feed plate is a series of teeth 32, which engage with the roll of dough and carry it forward with the plate. In the bottom of the trough is mounted the rollers 14 and 14ᴬ which facilitate the movement of the dough toward the cutter. The leg 3 is provided at the front end of the trough and extends up beyond the trough and has an opening 15 therein in line with the trough through which the dough can be passed to the cutter. Mounted in the leg 3 above this opening is a stud 16, on which is mounted to rotate a gage plate 17 and the cutting knife 18. The cutting knife carries a stud 19 which engages with the slot 20 in the gage plate so as to compel the gage plate and the knife to rotate in unison. The gage plate has a seat 21 thereon against which the knife rests and has an offset portion 22 which forms the gage for the cutting edge of the knife and determines the width of the noodles cut. On the seat is carried the projection 23 which is exposed below the edge of the knife and forms a stop for the roll of dough as it is pushed out before the edge of the knife begins to cut. The offset portion carries the projection 24 which engages with the cut portion of the noodles and breaks them off from the roll.

A handle 25 is provided for rotating the cutter and a handle 26 is provided for steadying the machine with one hand while the cutter is being rotated with the other hand.

To increase the thickness of the noodle which is cut I provide a washer 27 which is interposed between the cutter and its seat for the purpose of spacing the gage farther away from the cutting edge of the knife. This washer is provided with a recess 28 which engages with the stud 16 and the recess 29 which engages with the stud 19. The washer is inserted in place by loosening up on the thumb nut 30 and pulling out on the gage separating it sufficiently from the knife. The washer is then inserted first to engage with the stud 16 and then to engage with the stud 19, after which the stud 16 can be tightened up in the nut 31 and the thumb nut 30 can be tightened up again on the stud, fastening all parts in place then.

Because of the formation of the roll of dough, each revolution of the cutting knife will cut one long noodle, which will be coiled in a spiral.

I claim:

1. In a machine for cutting noodles, the combination of an inclined trough, rollers mounted to rotate transversely in said trough, a feeding plate mounted to slide over said trough, a pair of guide pins projecting on either side of said feeding plate and straddling said trough, guide pins projecting down into said trough at the rear of said feed plate, teeth carried on said feed plate to engage the dough, and a rotary cutting knife mounted at the end of said trough.

2. In a machine for cutting noodles, the combination of an inclined trough, rollers mounted to rotate transversely in said trough, a feeding plate mounted to slide over said trough, a pair of guide pins projecting on either side of said feeding plate and straddling said trough, guide pins projecting down into said trough at the rear of said feed plate, teeth carried on said feed plate to engage the dough, a rotary cutting knife mounted at the end of said trough, said knife comprising a knife blade, a gage plate mounted on said knife plate, said gage plate carrying a series of concentric extensions, said extensions being spaced from said knife blade, and means to increase or decrease the spacing between said gage plate and said knife blade.

In testimony whereof I affix my signature.

ALPHONSE ILTIS.

Copies of this patent may be obtained for five cents each, by addressing the "Commissioner of Patents, Washington, D. C."